United States Patent
Lee et al.

(10) Patent No.: US 6,932,944 B2
(45) Date of Patent: Aug. 23, 2005

(54) HIGH EFFICIENCY SCRUBBER FOR WASTE GAS ABATEMENT

(75) Inventors: Szetsen Steven Lee, Taipei (TW); Tsung-Cheng Yang, Taichung (TW)

(73) Assignee: Winbond Electronics Corp., Hsinchu (TW)

( * ) Notice: Subject to any disclaimer, the term of this patent is extended or adjusted under 35 U.S.C. 154(b) by 764 days.

(21) Appl. No.: 09/849,136

(22) Filed: May 4, 2001

(65) Prior Publication Data
US 2002/0136672 A1 Sep. 26, 2002

(30) Foreign Application Priority Data
Mar. 23, 2001 (TW) .......................... 90106865 A

(51) Int. Cl.[7] .............. C07C 1/00; H01S 3/22; B01D 50/00
(52) U.S. Cl. .............. 422/169; 372/59; 204/157.41; 204/157.15; 204/157.22
(58) Field of Search .............. 422/169–183, 422/186; 588/210; 423/210; 372/89

(56) References Cited
U.S. PATENT DOCUMENTS

| | | | | |
|---|---|---|---|---|
| 4,031,484 A | * | 6/1977 | Freiberg et al. | 372/59 |
| 4,188,592 A | * | 2/1980 | Buczek et al. | 372/89 |
| 4,226,369 A | * | 10/1980 | Botts et al. | 241/1 |
| 4,397,823 A | * | 8/1983 | Dimpfl | 423/210 |
| 4,479,443 A | * | 10/1984 | Faldt et al. | 588/311 |
| 4,555,389 A | * | 11/1985 | Soneta et al. | 423/210 |
| 5,108,718 A | * | 4/1992 | Dummersdorf et al. | 422/186.23 |
| 5,965,786 A | * | 10/1999 | Rostaing et al. | 588/210 |

FOREIGN PATENT DOCUMENTS

CN 1252832 A 5/2000

\* cited by examiner

*Primary Examiner*—Glenn Caldarola
*Assistant Examiner*—Tom P Duong
(74) *Attorney, Agent, or Firm*—J.C. Patents

(57) ABSTRACT

A gas scrubber comprises a gas inlet pipe that provides the scrubber with gases to be processed; means for initiating reactions of decomposition that is directed to initialize the decomposition of gases; an oxygen and natural gas inlet pipes to provide the necessary gases for combustion; a chamber of decomposition into which the gases to be processed are decomposed under thermal process carried out by combustion; and means for scrubbing byproducts produced in the chamber of decomposition. The means for initiating the reactions of decomposition is directed to initialize the decomposition of gas through producing radicals thereof. Thereby, the decomposition of gases under combustion in the chamber of decomposition can be accelerated, and less thermal energy is required from the combustion.

8 Claims, 3 Drawing Sheets

HIGH EFFICIENCY SCRUBBER FOR WASTE GAS ABATEMENT

CROSS-REFERENCE TO RELATED APPLICATION

This application claims the priority benefit of Taiwan application serial no. 90106865, filed on Mar. 23, 2001.

BACKGROUND OF THE INVENTION

1. Field of the Invention

The invention relates to a scrubber apparatus. More particularly, the invention relates to a scrubber apparatus for gas abatement.

2. Description of the Related Art

Semiconductor manufacturing processes generate substantial waste gases that need to be abated before discharging in atmosphere. Conventionally, waste gases produced during semiconductor manufacturing processes, such as fluorocarbon or PFC, are processed in a scrubber installed after exhausting pumps. Fluorocarbon is taken as exemplary waste gas in the following description since it is substantially used in semiconductor processes.

With reference to FIG. 1, a schematic view describes a conventional scrubber apparatus. In FIG. 1, waste gases comprising fluorocarbon gases are to be treated by the scrubber apparatus 10. Fluorocarbon gases are delivered through waste gas inlets 12. To decompose fluorocarbon gases, high temperature condition is necessary. Accordingly, combustion with natural gas, such as propane, associated with oxygen, both delivered through respectively incineration gas inlet 16 and oxygen gas inlet 14, is generated inside a divergent cone 18. The gas with byproducts produced during the combustion flows out of the divergent cone 18 through openings 20 into the chamber 22. Cooling means 24, comprising a cooling circuit 26, cools down the gases that are treated in the scrubber 10. The cooling means 24, besides cooling down byproducts generated by the combustion, also enhances the removal of hazardous acid gases such as described hereafter. The byproducts produced during the combustion are processed according to two ways. Hazardous acids are neutralized through a scrubbing liquid 28, which can be typically an alkaline solution. The rest of gases pass up through a scrubber 30, are cooled by the cooling means 24, and pass through a mist eliminator 32 to be finally discharged into atmosphere.

Issues related to the conventional scrubber, such as described above, principally lie in an occurrence of incomplete combustion. Incomplete combustion happens when the scrubber functions in a deficiency mode or when abnormal events occur during the combustion, the deficiency mode can be defined as a non-optimal functioning of the scrubber, which results in a combustion that does not provide sufficient heat to decompose adequately the waste gases. Consequently, secondary pollution may be generated because the scrubber apparatus 10 does not process the byproducts that are produced by the incomplete combustion. Untreated hazardous gases may be thus released into atmosphere and cause environment pollution.

Another drawback of the conventional scrubber apparatus 10 is that a substantial amount of energy must be provided to decompose the fluorocarbon gas constituents. As a result, thermal waste is unfavorably generated during the combustion that, consequently, also necessitates a lot of coolant and refrigeration power to cool down the gases and byproducts issued from the combustion. In other words, the conventional scrubber excessively consumes energy. A solution is thus needed to improve the conventional scrubber and overcome at least the issues and drawbacks described above.

SUMMARY OF THE INVENTION

One major aspect of the present invention is to provide a scrubber for waste gas abatement that can effectively decompose the waste gases.

To attain the foregoing and other objects, the present invention provides a scrubber for waste gas abatement that comprises a waste gas inlet pipe; a divergent cone onto which come out the waste gas inlet pipe, an oxygen pipe and a combustible pipe to generate combustion therein for decomposing the waste gases; a means for initiating the reactions of decomposition mounted onto the waste gas inlet pipe before the divergent cone; cooling means directed to cool down the scrubber; and means for treating the byproducts generated during the combustion.

With the above-described scrubber for waste gas abatement, the means for initiating the reactions of decomposition generates, inside the waste gas inlet pipe, radicals of waste gas constituents that effectively accelerate the decomposition of waste gases during combustion. The combustion consequently consumes less combustible than in the conventional scrubber and less coolant energy is also consumed.

In one embodiment of the present invention, the means for initiating the reactions of decomposition is a laser that, adapted with the waste gas inlet pipe, outputs a laser beam through the waste gas inlet, such that substantial amount of radicals of the waste gases flowing therein can be initially generated. Alternatively, the means for initiating the reactions of decomposition can be a microwave radiation generator.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The following detailed description of the embodiments and examples of the present invention with reference to the accompanying drawings is only illustrative and not limiting. A major aspect of the present invention is to facilitate and enhance the decomposition of waste gas constituents during combustion by generating radicals of waste gas constituents before they are submitted to the thermal process of combustion. The generation of radicals of waste gas constituents is carried out through applying a laser beam or microwave radiation to the waste gases just before the waste gases enter the divergent cone where the combustion takes place. As a result, the decomposition is facilitated and less energy is required to abate the waste gases.

Figure 1:
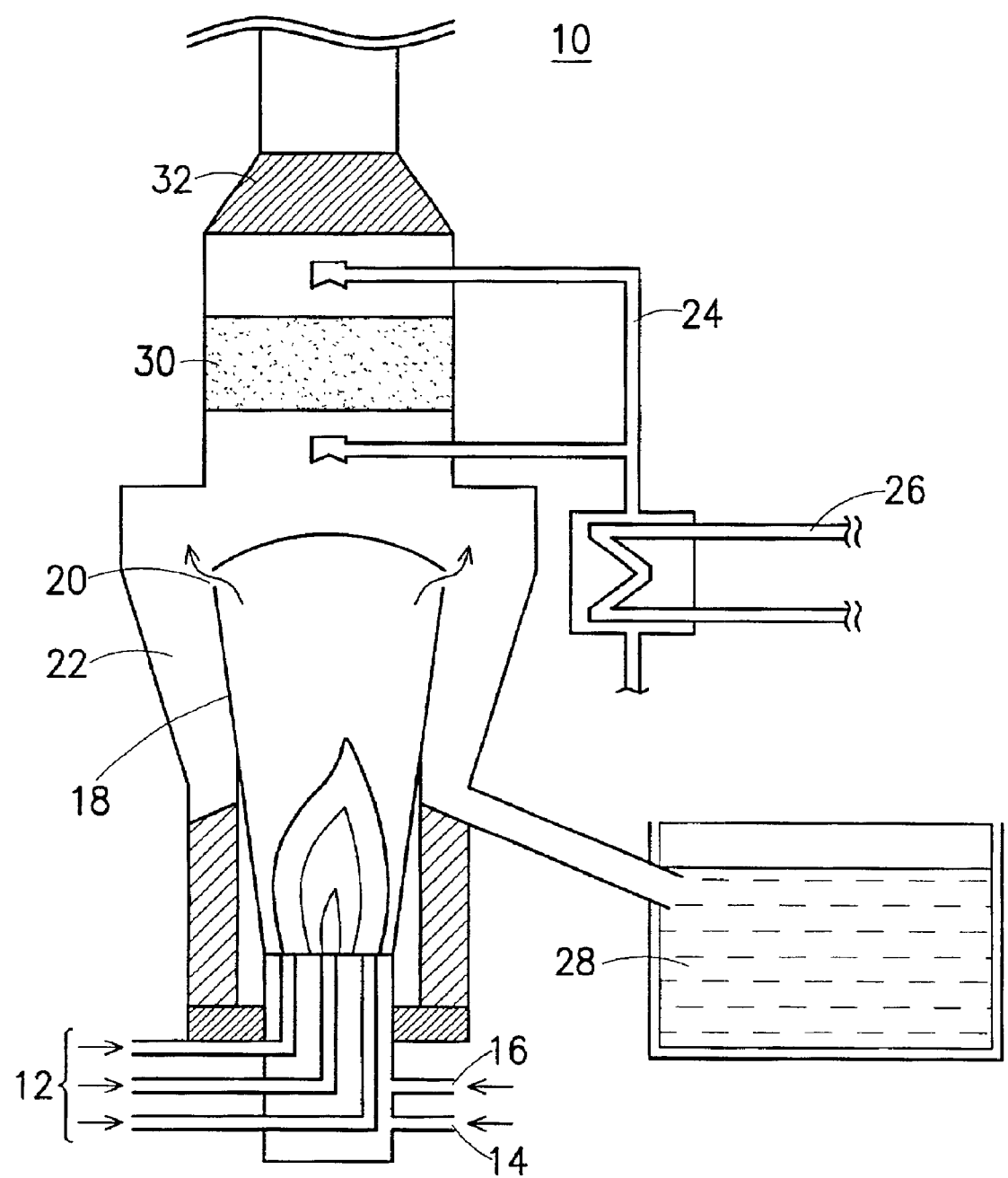
FIG. 1 is a schematic view illustrating a conventional waste gas scrubber apparatus.
Figure 2:
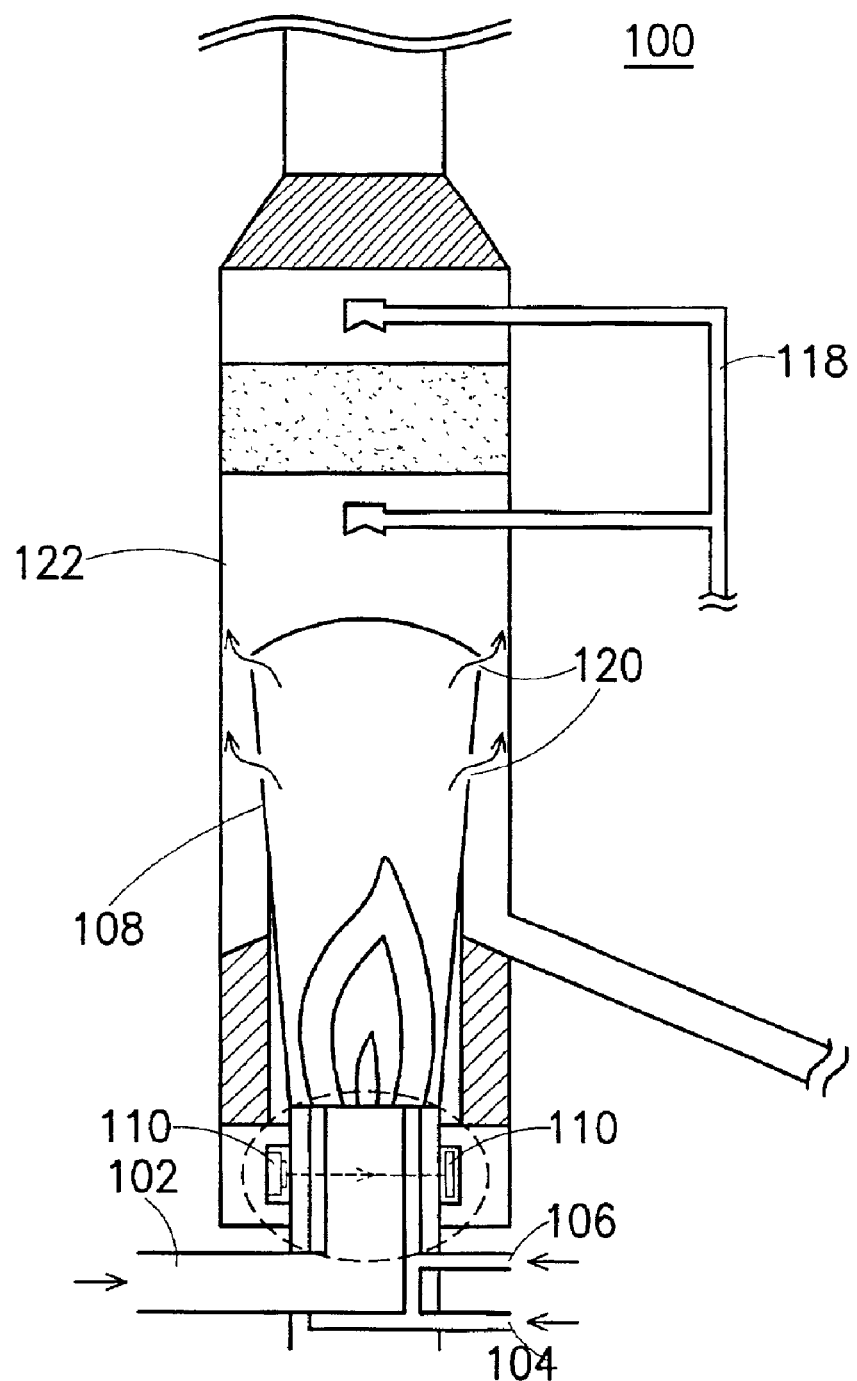
FIG. 2, FIG. 3a, and FIG. 3b are schematic views illustrating a waste gas scrubber apparatus according to a preferred embodiment of the present invention.
Figure 3A:
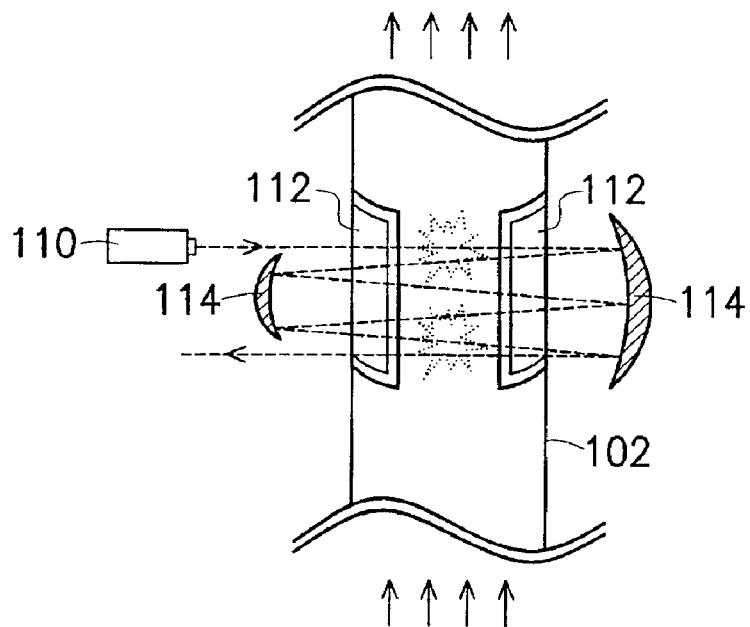
Figure 3B:
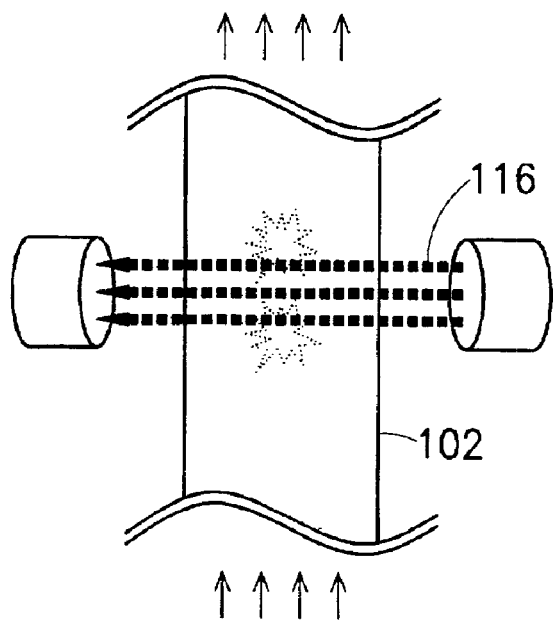

Referring now to FIG. 2, FIG. 3a and FIG. 3b, various views schematically illustrate a waste gas scrubber according to an embodiment of the present invention. The scrubber 100 processes waste gases that are delivered through a waste gas inlet pipe 102. Waste gases that are to be treated comprise, for example, fluorocarbon gases such as carbon tetrafluoride ($CF_4$) that are substantially generated during semiconductor manufacturing processes such as, for example, vapor depositions.

The present invention is constructed based upon the mechanism of decomposition of waste gas such as described hereafter, in exemplary reference to a decomposition of carbon tetrafluoride ($CF_4$). Carbon tetrafluoride ($CF_4$) gas, mixed with oxygen and natural gas that are delivered through oxygen gas inlet pipe 104 and incineration gas inlet pipe 106, is submitted to combustion in a divergent cone 108. The decomposition of carbon tetrafluoride ($CF_4$) that takes place is according to the following manner:

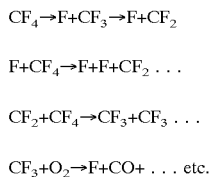

$$CF_4 \rightarrow F + CF_3 \rightarrow F + CF_2$$

$$F + CF_4 \rightarrow F + F + CF_2 \ldots$$

$$CF_2 + CF_4 \rightarrow CF_3 + CF_3 \ldots$$

$$CF_3 + O_2 \rightarrow F + CO + \ldots \text{etc.}$$

A first step of the chain reaction of decomposition is to trigger a break of chemicals bonds in carbon tetrafluoride ($CF_4$). Carbon difluoride ($CF_2$) radicals and fluor (F), thus formed, then provoke chain reactions to decompose again fluorocarbon gases, such as described above. Among those series of chain reactions, the reaction that breaks chemical bonds in ($CF_4$) is the reaction which is most energy consuming, brought by the combustion. The combustion would be more efficient to decompose the waste gases if radicals, such as ($CF_2$), are previously generated to initiate the chain reactions of decomposition, and less energy would be consumed. Hence, in accordance with the present invention, a means for initiating the reactions of decomposition 110 consequently is arranged before the divergent cone 108 to improve efficiently the reaction of decomposition under thermal process supplied by combustion in the divergent cone 108. The waste gas inlet pipe 102 thus is arranged to be adapted to the means for initiating the reactions of decomposition 110, such that radicals can be generated thereby. The means for initiating the reactions of decomposition 110 can be, for example, a laser or microwave radiation generator.

FIG. 3a and FIG. 3b are enlarged views of the region of the scrubber comprising the means for initiating the reactions of decomposition 110.

Referring to FIG. 3a, a schematic view illustrates the case where the means for initiating the reactions of decomposition 110 is a laser device. Transparent means, such as windows 112, are specifically adapted onto the gas inlet pipe 102 while a set of reflective mirrors 114 are arranged out of the gas inlet pipe 102. As a result, the laser beam can be sent a plurality of times through the gas inlet pipe 102. Under the intense focused laser beam, carbon tetrafluoride ($CF_4$) molecules inside the gas inlet pipe 102 are easily ionized or dissociated into carbon difluoride ($CF_2$) radicals at low temperature. FIG. 3b illustrates an alternative use of microwave radiation 116, produced by a microwave radiation generator, instead of laser beam for generating carbon difluoride ($CF_2$) radicals.

In the embodiment of the present invention where a laser device is used, the laser device 110 is arranged such that the laser focal point is approximately 50 cm distant from the divergent cone 108. The waste gas inlet pipe 102 has a cross section that is 0.317 $cm^2$ and gas flow rate therein is 16.7 cc/s. The laser used can be commercial high power laser which frequency stability is within the range of megahertz. The width of laser pulse is adjusted to 1 $\mu s$, and spot size of focal point is 0.1 mm to 1 mm. With the use of a convergent lens, higher radical concentration can be expected. The generated radical concentration is of about $10^{13}$ mol/cc when the laser power focus is in the order of megawatts per $cm^2$. Radical recombination rate being $10^9$ mol/s, $10^9$ mol/cc of carbon tetrafluoride ($CF_4$), by recombination with radicals, are thus decomposed between the location where the laser is applied and the divergent cone 108. In comparison with the present invention, in the traditional combustion method, the radical recombination rate is only $10^{-3}$ mol/s. The cause of this relatively low rate is that only a small percentage of the thermal energy provided by the combustion participates effectively to the breaking of chemical bonds, a substantial remaining part of the thermal energy being distributed and dissipated into other different modes that do not intervene in bond breaking. In contrast, since laser is wavelength-specific i.e bond-specific, when a laser beam is applied to the waste gases before entering the divergent cone 108, such as used in the present invention, output energy is almost completely used to break the bonds within the constituents to be decomposed. Moreover, because laser is accurate and specific in wavelength control, waste gases different from the above exemplary mentioned carbon tetrafluoride ($CF_4$) can also be initially decomposed using the laser-assisted scrubber of the present invention. As a result, numerous radicals thence generated thus arrive at the divergent cone 108, which advantageously accelerates the chain reactions of decomposition during combustion that, consequently, is not required to provide as much thermal energy as in the conventional scrubber, and consumes substantially less oxygen and natural gas combustible. As a result, cooling means 118 is also less energy consumer. Then, byproducts produced within divergent cone 108 pass through openings 120 into the chamber 122 to be processed by means for gas scrubbing, as in the conventional scrubber.

In summary, the foregoing description of embodiments and examples of the present invention reveals at least the following features and advantages. Radicals of waste gas constituents can be advantageously generated at lower temperature through using the means for initiating the reaction of decomposition, such as laser device or microwave radiation generator. Thus, the reaction of decomposition can be substantially accelerated under the thermal process carried out through combustion, with a substantial reduction of hazardous byproducts amount that may be generated. Moreover, since the temperature of decomposition is reduced, the combustion can provide less thermal energy than in the conventional scrubber while the decomposition of gas is more efficient. Consequently, combustible consumption is substantially reduced as well as cooling energy.

It will be apparent to those skilled in the art that various modifications and variations can be made to the structure of the present invention without departing from the scope or spirit of the invention.

What is claimed is:

1. A gas scrubber comprising:
   a gas inlet pipe that provides the gas scrubber with gases to be processed;
   a chamber of decomposition to which is connected the gas inlet pipe that delivers the gases to be processed, such that the gases are decomposed into a plurality of different byproducts through a thermal process in the chamber of decomposition;
   a transparent means through which light can pass through, mounted onto the gas inlet pipe before the chamber of decomposition;
   a laser device arranged before the chamber of decomposition such that a laser beam, output by the laser device, passes through the transparent means and the gases flowing in the gas inlet pipe to decompose the gases into a plurality of gas radicals to initiate the reaction of decomposition;
   means for cooling down the plurality of byproducts produced in the chamber of decomposition; and
   means for scrubbing the plurality of byproducts produced in the chamber of decomposition.

2. The scrubber of claim 1, wherein a set of reflective mirrors is farther arranged such that the laser beam passes through the gases a plurality of times.

3. The scrubber of claim 2, wherein the cross-section of the gas inlet pipe is 0.317 $cm^2$.

4. The scrubber of claim 3, wherein the flow rate in the gas inlet pipe is 16.7 cc/s.

5. The scrubber of claim 4, wherein the laser focal point is approximately 50 cm distant from the chamber of decomposition.

6. The scrubber of claim 5, wherein the laser pulse width is 1 $\mu$s, the spot size of focal point of the laser is approximately 0.1 to 1 mm, and the laser focus intensity is in the order of megawatts/$cm^2$.

7. The scrubber of claim 6, wherein the gases that are processed are fluorocarbon gases.

8. The scrubber of claim 7, wherein approximately $10^9$ mol/cc of gas are initially decomposed before the chamber of decomposition.

* * * * *